(12) United States Patent
Norbäck et al.

(10) Patent No.: US 8,149,981 B2
(45) Date of Patent: Apr. 3, 2012

(54) METHODS AND DEVICES RELATING TO A NUCLEAR LIGHT WATER REACTOR OF THE BOILING WATER KIND

(75) Inventors: Gunilla Norbäck, Västerås (SE); Carl Adamsson, Stockholm (SE)

(73) Assignee: Westinghouse Electric Sweden AB (SE)

( * ) Notice: Subject to any disclaimer, the term of this patent is extended or adjusted under 35 U.S.C. 154(b) by 631 days.

(21) Appl. No.: 12/244,812

(22) Filed: Oct. 3, 2008

(65) Prior Publication Data

US 2009/0257544 A1    Oct. 15, 2009

(30) Foreign Application Priority Data

Oct. 10, 2007   (EP) ..................................... 07118186

(51) Int. Cl.
G21C 19/00    (2006.01)
(52) U.S. Cl. ......... 376/260; 376/277; 376/245; 376/254
(58) Field of Classification Search .................. 376/260, 376/277, 245, 254
See application file for complete search history.

(56) References Cited

U.S. PATENT DOCUMENTS

| | | | |
|---|---|---|---|
| 5,912,933 A | 6/1999 | Shaug et al. | |
| 2002/0122521 A1 | 9/2002 | Bolger et al. | |

FOREIGN PATENT DOCUMENTS

| | | |
|---|---|---|
| DE | 44 16 463 | 11/1994 |
| EP | 0 405 863 | 1/1991 |
| EP | 1 113 457 | 7/2001 |
| EP | 1 221 701 | 7/2002 |
| EP | 1 775 732 | 4/2007 |
| JP | 2-130498 | 5/1990 |
| SE | 509 235 | 12/1998 |

*Primary Examiner* — Ricardo Palabrica
(74) *Attorney, Agent, or Firm* — Alston & Bird LLP

(57) ABSTRACT

A method of determining the R-factor for a bundle of nuclear fuel rods in a nuclear light water reactor of the boiling water reactor kind. The R-factor is a factor that accounts for the weighted local power influence on a fuel rod. A local R-factor $(R_i(z))$ is determined for each fuel rod (i) in said bundle and for each of a plurality of levels (z) in an axial direction. The individual axial heat generation profile for a certain fuel rod (i) is taken into account when determining the local R-factors $(R_i(z))$ for said fuel rod (i). A processor is configured for automatically determining the R-factor. A computer program product, a method of determining the critical power for a bundle of fuel rods, a nuclear energy plant, and a method of operating a nuclear energy plant are also described.

17 Claims, 2 Drawing Sheets

METHODS AND DEVICES RELATING TO A NUCLEAR LIGHT WATER REACTOR OF THE BOILING WATER KIND

BACKGROUND OF THE INVENTION

The present invention relates to the determination of dryout properties in nuclear light water reactors, more specifically in a boiling water reactor (BWR). The invention is in particular related to a method of determining the so-called R-factor, which is used when determining the dryout properties in a nuclear boiling water reactor. The R-factor(s) is a concept that is known to a person skilled in the art, and which accounts for the weighted local power influence on a nuclear fuel rod, including contributions from neighbouring fuel rods.

The invention also concerns a processor configured for automatically determining the R-factor, a computer program product, a method of determining the critical power for a bundle of fuel rods, a nuclear energy plant, and a method of operating a nuclear energy plant.

The fuel rods in a BWR core are grouped in bundles with spacers and usually also end plates to keep the fuel rods in each bundle in a predetermined geometry. The predetermined rod lattice may be regular or irregular and even change axially. The bundles are then enclosed by channels to direct the coolant flow upward and give the fuel arrangement mechanical and thermal hydraulic stability and facilitate handling and exchange of the fuel. A fuel assembly may comprise several (for example 4) bundles (sometimes also referred to as subbundles) of fuel rods. In other constructions, each fuel assembly includes only one bundle of fuel rods.

The fuel bundle may vary considerably in size concerning the number of fuel rods and it may also contain special purpose rods such as tie rods, water rods and burnable absorber rods. The bundle may comprise both full length rods and so-called part length rods, which are essentially shorter than the full length rods. The fissile material enrichment can vary within the fuel rod and may also vary from fuel rod to fuel rod. The present invention is applicable to all of these fuel arrangements and their operation in the reactor.

As is well known to a person skilled in the art, in a BWR a cooling medium in the form of water flows through the fuel assemblies, which contain the fuel rods. The purpose of the water is to cool the fuel rods and to act as a neutron moderator. A mixture of steam and water flows through the fuel bundle, providing cooling for the rods by convective and boiling heat transfer. As the steam quality (the steam content fraction) of the coolant increases, the flow pattern changes. At a certain point in the bundle, an annular flow pattern is formed. This implies existence of a thin liquid film on the surface of the rods, and a mixture of vapour and droplets in the channels between the rods. The existence of this film allows for efficient heat transfer from the rods to the coolant. This enables both effective steam generation and prevents the rods from overheating. The breakdown of this film is referred to as dryout.

In a BWR, dryout should be avoided. Dryout deteriorates heat transfer from the fuel rods to the reactor cooling medium and therefore leads to an increased temperature of the walls of the fuel rods. The increased temperature can damage the fuel rods. If a BWR is operated at or above a certain high power, the so-called critical power (CP), dryout may thus occur. In order to avoid dryout, the reactor is therefore operated at a lower power, such that a certain safety margin exists, the so-called dryout margin. A measure of the dryout margin is the critical power ratio (CPR). The CPR can be defined as the following ratio:

CPR=(critical power)/(actual power)

The CPR can be calculated locally for a large number of points in the reactor core. The smallest value of the CPR in any point is called the minimum critical power ratio MCPR.

In the following critical power and critical heat flux and critical steam quality are treated as synonymous or equivalent entities as there exist straight forward physical transformation laws between them in steady state operation. With the coolant flow and the inlet enthalpy known, the steam quality directly provides the fuel arrangement power with steam/water thermodynamic data and vice versa.

Different methods of determining the critical power are known in the prior art. EP 1 775 732 A1, and the corresponding U.S. patent application Ser. No. 11/512,938, which are incorporated herein by reference, describe one such method. Independently of with which method the critical power is determined, it is usually necessary to take the above mentioned R-factor into account. The R-factor is also mentioned in the above cited EP 1 775 732 A1 (and the corresponding US patent application).

According to the prior art, the R-factor for a certain fuel rod in a bundle of fuel rods is normally determined by taking the effect from neighbouring fuel rods into account and by using a predetermined weight function for the axial variation of the R-factor. This weight function is normally such that the upper levels of the fuel bundle have a higher weight than the lower levels. The weight function is common to all the fuel rods in the bundle. Furthermore, the levels above part length rods are normally compensated for by using very high additive constants. In this manner, according to the prior art, it is possible to determine an R-factor for every fuel rod in the bundle of fuel rods. The highest R-factor for the different fuel rods in the fuel bundle is taken as the R-factor for the whole bundle. This R-factor is used when determining the critical power ratio for the fuel bundle in question.

SUMMARY OF THE INVENTION

An object of the present invention is to provide an improved method of determining the R-factor(s) in a nuclear light water reactor of the boiling water reactor kind. A further object is to provide such a method which takes the properties of the individual fuel rods better into account than according to the prior art. Another object is to provide such a method, which results in a more accurate R-factor or R-factors for a fuel bundle that includes part length fuel rods.

These objects are achieved by a method as defined in claim 1.

According to the invention, a local R-factor $(R_i(z))$ is thus determined for each fuel rod (i) in said bundle and for each of a plurality of levels (z) in the axial direction. Furthermore, the individual axial heat generation profile for a certain fuel rod (i) is taken into account when determining the local R-factors $(R_i(z))$ for said fuel rod (i). With this method, the R-factors, and thereby the dryout properties, can be determined more accurately than with previous methods.

With the present invention it is thus not necessary to use the above described predetermined weight function for the axial variation of the R-factor. Such a predetermined weight function could not be optimized for each level for each fuel rod. However, with the present invention, the local R-factors can be determined accurately since the individual axial heat generation profiles for the fuel rods are used when determining the local R-factors. Furthermore, with the present invention also the local R-factors for shorter fuel rods (so-called part length rods) can be determined accurately, since the individual axial heat generation profile for the fuel rods are used when determining the local R-factors. With the present invention it is therefore not necessary to compensate for the shorter fuel rods by using the above mentioned very high additive constants.

According to a preferred implementation of the method according to the invention, said number of levels is at least equal to 10. By using at least 10 levels, the R-factor profile is determined with acceptable accuracy.

Although the local R-factors could be determined for an infinite number of levels (continuously in the axial direction), the local R-factors are preferable determined for a limited number of levels in the axial direction, in order to facilitate the determination. The number of levels could for example be between 15 and 50, preferably between 20 and 30, for example 25.

Preferably, said bundle of nuclear fuel rods includes at least 15 fuel rods. The bundle can be a so-called subbundle and the number of fuel rods in this bundle may for example be 24. Alternatively, the bundle can include a larger number of fuel rods, for example all the fuel rods of a fuel assembly.

According to a preferred manner of carrying out the method according to the invention, the method comprises the determination of a total R-factor ($R_z$) for each of said levels (z) for the whole bundle of fuel rods, wherein said total R-factor ($R_z$) at a level (z) is determined as the maximum of said local R-factors ($R_i(z)$) at said level (z) in said bundle of nuclear fuel rods. Such a total R-factor is convenient to use when determining the dryout properties for the fuel assembly or for the subbundle.

According to a manner of carrying out the method according to the invention, the determination of said local R-factor ($R_i(z)$) at a level (z) for a certain fuel rod (i) includes the determination of the double integrated heat generation rate of said fuel rod (i) up to the level (z) relative to the double integrated average heat generation rate of all fuel rods in the bundle up to the level (z). Such a determination has been found to provide an advantageous manner of determining the local R-factors.

It should be noted that the concept "integrated" does in this document not necessarily mean that the integration is continuous. Instead, according to a preferred embodiment, the "integration" is done for discrete levels. The integral symbol in the shown formulas can therefore instead be seen as a summation symbol concerning such discrete levels.

Preferably, said determination also includes a normalisation by means of the integrated heat generation rate of said fuel rod up to the level (z) relative to the integrated average heat generation rate of all fuel rods in the bundle up to the level (z), wherein the normalised determination of the double integrated heat generation rate of said fuel rod (i) up to the level (z) relative to the double integrated average heat generation rate of all fuel rods in the bundle up to the level (z) is carried out by determining:

$$\left[\frac{\int_{z_0}^{z} q_i(z')dz' \int_{z_0}^{z}\int_{z_0}^{z'} \overline{q}(z'')dz''dz'}{\int_{z_0}^{z} \overline{q}(z')dz' \int_{z_0}^{z}\int_{z_0}^{z'} q_i(z'')dz''dz'}\right]^a$$

or an equivalent expression, where
z=axial position z'=integration variable representing the axial position
z''=integration variable representing the axial position
$q_i(z)$=linear heat generation rate of rod i at the level z
$\overline{q}(z)$=average linear heat generation rate of all rods in the bundle at the level z
$z_0$=the axial position of bulk boiling boundary (zero steam quality limit) in said bundle
a=a constant, 0<a<1

Such a normalisation facilitates the determination of the R-factor influence on the dryout properties.

According to one manner of carrying out the method according to the invention, the determination of said local R-factor ($R_i(z)$) at a level (z) for a certain fuel rod (i) includes the determination of the sum of the integrated heat generation rate of said fuel rod up to the level (z) and a fraction of the integrated heat generation rates of fuel rods neighbouring said fuel rod up to the level (z), relative to the integrated average heat generation rate of all fuel rods in the bundle up to the level (z). Such a determination improves the accuracy of the determination of the local R-factors.

The mentioned determination of the sum of the integrated heat generation rate of said fuel rod up to the level (z) and a fraction of the integrated heat generation rates of fuel rods neighbouring said fuel rod up to the level (z), relative to the integrated average heat generation rate of all fuel rods in the bundle up to the level (z) is preferably carried out by determining:

$$\frac{\left(\int_{z_0}^{z} q_i(z')dz'\right)^b + c\sum_{j \in S_i}\left(\int_{z_0}^{z} q_j(z')dz'\right)^b + d\sum_{k \in D_i}\left(\int_{z_0}^{z} q_k(z')dz'\right)^b}{(1 + cN_{S_i} + dN_{D_i})\left(\int_{z_0}^{z} \overline{q}(z')dz'\right)^b}$$

or an equivalent expression, where the symbols are as explained above and where
$q_j(z)$=linear heat generation rate of side neighbouring fuel rod j at the level z
$q_k(z)$=linear heat generation rate of diagonal neighbouring fuel rod k at the level z
$S_i$=the set of side neighbouring fuel rods for the fuel rod i
$D_i$=the set of diagonal neighbouring fuel rods for the fuel rod i
$N_{Si}$=the number of side neighbouring fuel rods for the fuel rod i
$N_{Di}$=the number of diagonal neighbouring fuel rods for the fuel rod i
b=a constant, 0<b<1
c=a constant, 0<c<1
d=a constant, 0<d<c This has proved to be an accurate an efficient manner of performing the determination.

Preferably, the determination of said local R-factor at a level (z) for a certain fuel rod (i) is carried out by determining:

$$R_i(z) = (1 + e_i)\left[\frac{\int_{z_0}^{z} q_i(z')dz' \int_{z_0}^{z}\int_{z_0}^{z'} \overline{q}(z'')dz''dz'}{\int_{z_0}^{z} \overline{q}(z')dz' \int_{z_0}^{z}\int_{z_0}^{z'} q_i(z'')dz''dz'}\right]^a$$

-continued $$\frac{\left(\int_{z_0}^{z} q_i(z')dz'\right)^b + c\sum_{j \in S_i}\left(\int_{z_0}^{z} q_j(z')dz'\right)^b + d\sum_{k \in D_i}\left(\int_{z_0}^{z} q_k(z')dz'\right)^b}{(1 + cN_{S_i} + dN_{D_i})\left(\int_{z_0}^{z} \overline{q}(z')dz'\right)^b}$$

or an equivalent expression, where the symbols are as explained in the previous embodiments, and where
$e_i$=the dryout sensitivity constant for the fuel rod i (also denoted "rod constant")

According to another aspect, the invention provides a processor configured for automatically determining the R-factor for a bundle of nuclear fuel rods in a nuclear light water reactor of the boiling water reactor kind. The reactor comprises a plurality of bundles of nuclear fuel rods, wherein the fuel rods in the bundle are arranged side by side, at least substantially parallel to each other, and extend essentially in an axial direction. The R-factor is a factor that accounts for the weighted local power influence on a fuel rod, including contributions from neighbouring fuel rods. According to the invention, the processor is configured with an input receiving data concerning the linear heat generation rate ($q_i(z)$) of the different fuel rods (i) at the different levels (z) in said bundle and to determine the R-factor in accordance with any one of the preceding embodiments.

Similarly, the invention provides a computer program product directly loadable into the internal memory of a computer, which computer program product comprises a computer program configured to carry out a method according to any one of the preceding embodiments of the method.

With such a processor, and with such a computer program product, the advantages described above in connection with the method are achieved.

The invention also provides a method of determining the critical power for a bundle of nuclear fuel rods in a nuclear light water reactor of the boiling water reactor kind, wherein said method includes the determination of an R-factor according to any one of the preceding embodiments of the method.

The invention also provides a method of determining the critical power by means of the local steam quality at dryout ($X_{DO}$) for a bundle of nuclear fuel rods in a nuclear light water reactor of the boiling water reactor kind. This method comprises the following:
determining how the local steam quality at dryout ($X_{DO}$) depends on the flow of the cooling medium through the nuclear fuel bundle ($f_1(G)$),
determining how the local steam quality at dryout ($X_{DO}$) depends on the axial power profile of the nuclear fuel bundle ($f_2(I_2)$),
determining how the local steam quality at dryout ($X_{DO}$) depends on the R-factor of the nuclear fuel arrangement ($f_3(R)$),
determining how the local steam quality at dryout ($X_{DO}$) depends on the pressure of the cooling medium in the nuclear fuel arrangement ($f_4(P)$), and
determining the local steam quality at dryout ($X_{DO}$) on the basis of the previous determinations. This method is characterised in that the R-factor dependence is determined by using the method of any one of the embodiments of the method described above for determining the R-factor.

The invention also provides a nuclear energy plant comprising a nuclear light water reactor of the boiling water reactor kind. The plant comprises a control unit arranged to carry out a method according to any one of the two preceding paragraphs.

According to one embodiment of the nuclear energy plant, it includes operation parameter detectors, arranged to detect operation parameters of the nuclear reactor during operation, wherein the control unit is arranged to receive information concerning said operation parameters from the detectors and to use these operation parameters when carrying out the method.

According to one embodiment, the control unit comprises control outputs arranged to control the operation of the nuclear reactor in dependence on said method carried out by the control unit.

Furthermore, the invention concerns a computer program product directly loadable into the internal memory of a computer which can form part of the above defined control unit, which computer program product comprises a computer program configured to carry out a method according to any one of the above embodiments of the method of determining the critical power.

Finally, the invention provides a method of operating a nuclear energy plant comprising a nuclear light water reactor of the boiling water reactor kind, wherein said method includes the following steps:
provide information concerning operation parameters of the nuclear reactor,
use this information in a method according to any one of the above embodiments of the method of determining the critical power, and control the operation of the nuclear reactor in dependence on the previous method step.

All these different aspects of the invention have advantages corresponding to those described above.

DETAILED DESCRIPTION OF THE DRAWINGS

The different aspects of the invention can be used on a nuclear energy plant when in operation. However, the invention as defined in claims 1-13 can also be used before the nuclear energy plant is in operation, for example in order to determine the dryout properties of the nuclear energy plant before it is actually in operation. In this manner it can be ensured that the correct dryout margin is the case before the plant is actually in operation.

Figure 1:
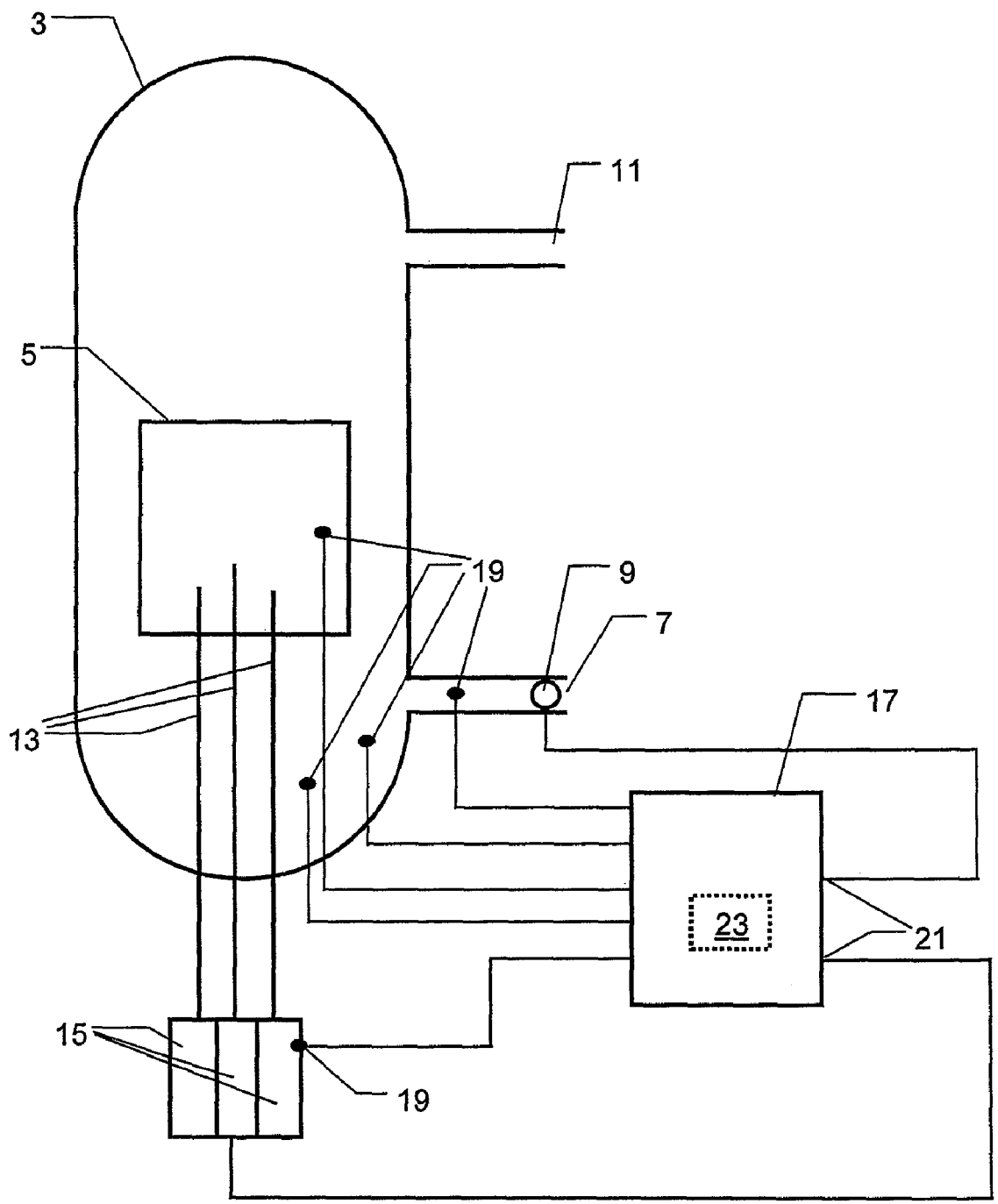
FIG. 1 shows schematically a nuclear energy plant.

FIG. 1 shows schematically a nuclear energy plant, which constitutes an embodiment of the present invention.

The nuclear energy plant comprises a nuclear light water reactor of the boiling water reactor kind. The nuclear reactor has a reactor vessel 3 in which the reactor core 5 is located. As is known to a person skilled in the art, the reactor core 5 comprises a plurality of bundles of nuclear fuel rods, wherein fuel rods in the bundle are arranged side by side, at least substantially parallel to each other, and extend essentially in an axial direction. Water is fed to the reactor vessel 3 via a water inlet 7 with the help of a pump 9. The generated steam leaves the vessel 3 via an outlet 11. Control rods 13 can be moved relative to the core 5 with the help of a control rod drive unit 15.

The nuclear energy plant has a control unit 17, which suitably includes a computer. This control unit 17 is arranged to carry out a method according to the invention. The control unit 17 can thus for example be arranged to calculate the margin to dryout for different parts of the core 5 of the nuclear reactor by being arranged (programmed) to carry out a method according to the invention for example for determining the critical power, and to thereby determine the R-factor for a bundle of nuclear fuel rods according to a method according to the invention.

The control unit 17 can be connected to operation parameter detectors 19, arranged to detect operation parameters of the nuclear reactor during operation. The detectors 19 can directly or indirectly detect operation parameters such as the mass flow of the cooling medium (the water), the pressure of the cooling medium, the position of the control rods 13 in the reactor core 5 and the neutron flux in different parts of the core 5. It is known to a person skilled in the art how to detect such operation parameters of a nuclear reactor.

The control unit 17 is thus arranged to receive information concerning said operation parameters from the detectors 19 and to use these operation parameters when carrying out the mentioned method, for example for determining a dryout margin in different parts of the reactor core 5.

Based on the calculated dryout margin, a person responsible for the operation of the nuclear energy plant can increase or decrease the power with which the nuclear reactor operates.

Alternatively, the control unit 17 can have control outputs 21 arranged to automatically control the operation of the nuclear reactor in dependence on said method carried out by the control unit 17. It should be noted that the concept "control unit" as used herein thus includes two possibilities: either the control unit 17 constitutes a supervision unit which supplies information to a person (the operator), who can then manually control the operation of the nuclear energy plant (an open loop), or the control unit 17 can include means for automatically controlling the nuclear energy plant (a closed loop). However, in both cases the control unit preferably includes means (e.g. a computer) arranged to automatically carry out a method according to the invention, in order to provide information concerning the dryout properties of the nuclear reactor.

The person skilled in the art knows how to control the power of a nuclear reactor. This can for example be done by changing the mass flow of the cooling medium, with the help of the pump 9, or by changing the position of the control rods 13, with the help of the control rod drive unit 15. The outputs 21 from the control unit 17 can thus be arranged to change for example the mass flow of the cooling medium or the position of the control rods 13.

The invention also provides a computer program product 23 directly loadable into the internal memory of a computer which can form part of the control unit 17. The computer program product 23 comprises a computer program recorded on a computer-readable medium, the program being configured to cause the computer to carry out a method according to the invention for determining the R-factor and/or the critical power for a bundle of nuclear fuel rods in the nuclear reactor.

23 may also refer to a processor configured for automatically determining the R-factor for a bundle of nuclear fuel rods in the nuclear light water reactor. As already mentioned, the R-factor is a factor that accounts for the weighted local power influence on a fuel rod, including contributions from neighbouring fuel rods. The processor is configured with an input receiving data concerning the linear heat generation rate ($q_t(z)$) of the different fuel rods (i) at the different levels (z) in said bundle and to determine the R-factor in accordance with a method according to the invention.

Figure 2:
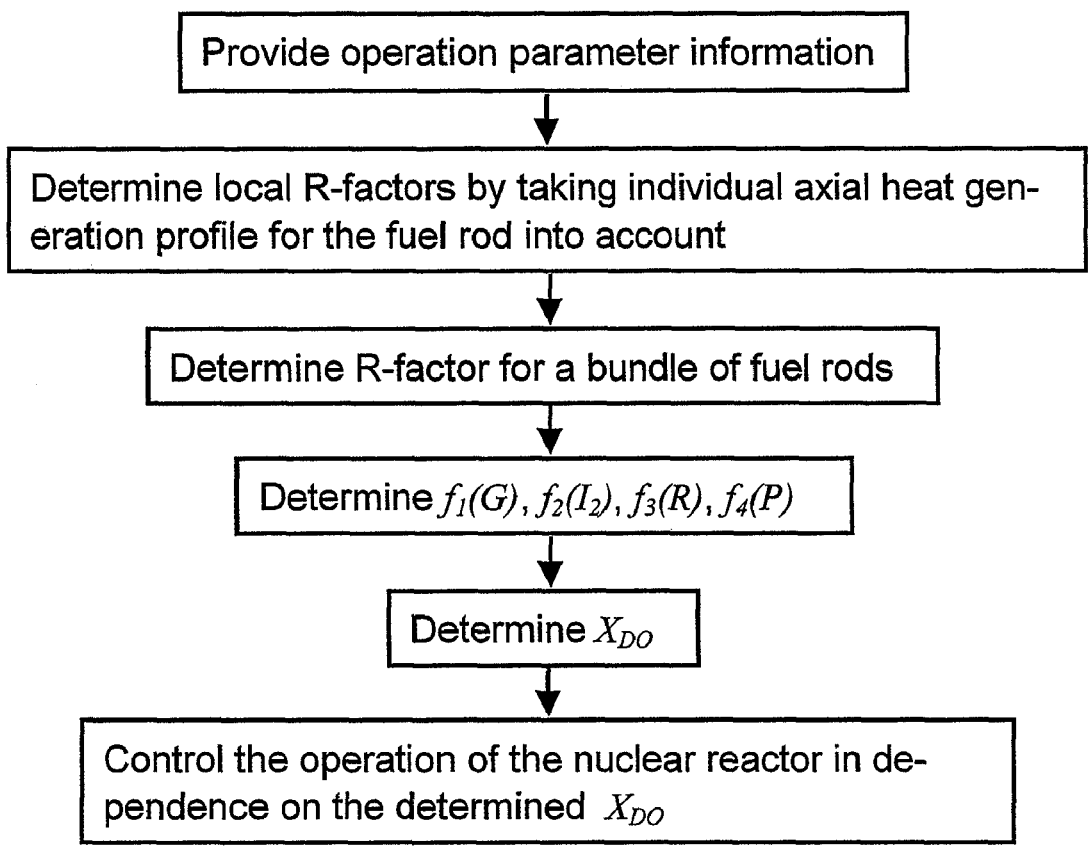
FIG. 2 is a schematic flow chart of an example of a method according to the invention.

With reference to FIG. 2, an example of a method, according to the invention, of operating a nuclear energy plant will now be described. The nuclear light water reactor is of the boiling water reactor kind.

Information is provided concerning operation parameters of the nuclear reactor as described above.

This information is used in a method, according to the invention, of determining the critical power for a bundle of nuclear fuel rods in the nuclear reactor.

The critical power can be determined in different manners, for example as described in the above mentioned EP 1 775 732 A1, and the corresponding U.S. patent application Ser. No. 11/512,938. The critical power may thus be determined by means of the local steam quality at dryout ($X_{DO}$) for a bundle of nuclear fuel rods by:

determining how the local steam quality at dryout ($X_{DO}$) depends on the flow of the cooling medium through the nuclear fuel bundle ($f_1(G)$), determining how the local steam quality at dryout ($X_{DO}$) depends on the axial power profile of the nuclear fuel bundle ($f_2(I_2)$), determining how the local steam quality at dryout ($X_{DO}$) depends on the R-factor of the nuclear fuel arrangement ($f_3(R)$), determining how the local steam quality at dryout ($X_{DO}$) depends on the pressure of the cooling medium in the nuclear fuel arrangement ($f_4(P)$), and by determining the local steam quality at dryout ($X_{DO}$) on the basis of the previous determinations. As explained in the above cited documents, the local steam quality at dryout $X_{DO}$ can be thus described as a function:

$$X_{DO} = f_1(G) f_2(I_2) f_3(R) f_4(P) + \text{optional terms}$$

When $X_{DO}$ or another suitable measure of the dryout property has been determined, the operation of the nuclear reactor can be controlled in dependence on the determined property, such that the nuclear reactor is operated with a sufficient safety margin.

When determining the R-factor dependence, the R-factor is determined by using the method according to the present invention. One manner of doing this is described below.

The R-factor is thus determined for a bundle of nuclear fuel rods in a nuclear light water reactor of the boiling water reactor kind, which reactor comprises a plurality of bundles of nuclear fuel rods. The fuel rods in the bundle are arranged side by side, at least substantially parallel to each other, and extend essentially in an axial direction. The bundle of nuclear fuel rods may for example include 24 fuel rods. For determining the R-factor for a bundle, first a local R-factor ($R_i(z)$) is determined for each fuel rod (i) in said bundle and for each of a plurality of levels (z) in said axial direction. The number of levels may for example be 25. The individual axial heat generation profile for a certain fuel rod (i) is taken into account when determining the local R-factors ($R_i(z)$) for said fuel rod (i).

A total R-factor ($R_z$) for each of said levels (z) for the whole bundle of fuel rods can thereby be determined, wherein said total R-factor ($R_z$) at a level (z) is determined as the maximum of said local R-factors ($R_i(z)$) at said level (z) in said bundle of nuclear fuel rods.

The determination of said local R-factor ($R_i(z)$) at a level (z) for a certain fuel rod (i) includes the determination of the double integrated heat generation rate of said fuel rod (i) up to the level (z) relative to the double integrated average heat generation rate of all fuel rods in the bundle up to the level (z).

The determination also includes a normalisation by means of the integrated heat generation rate of said fuel rod up to the level (z) relative to the integrated average heat generation rate of all fuel rods in the bundle up to the level (z).

Furthermore, the determination of said local R-factor ($R_i$(z)) at a level (z) for a certain fuel rod (i) includes the determination of the sum of the integrated heat generation rate of said fuel rod up to the level (z) and a fraction of the integrated heat generation rates of fuel rods neighbouring said fuel rod up to the level (z), relative to the integrated average heat generation rate of all fuel rods in the bundle up to the level (z).

The determination of said local R-factor at a level (z) for a certain fuel rod (i) can thereby be is carried out by determining:

$$R_i(z) = (1+e_i)\left[\frac{\int_{z_0}^{z} q_i(z')dz' \int_{z_0}^{z}\int_{z_0}^{z'} \bar{q}(z'')dz''dz'}{\int_{z_0}^{z}\bar{q}(z')dz' \int_{z_0}^{z}\int_{z_0}^{z'} q_i(z'')dz''dz'}\right]^a$$

$$\frac{\left(\int_{z_0}^{z}q_i(z')dz'\right)^b + c\sum_{j\in S_i}\left(\int_{z_0}^{z}q_j(z')dz'\right)^b + d\sum_{k\in D_i}\left(\int_{z_0}^{z}q_k(z')dz'\right)^b}{(1+cN_{S_i}+dN_{D_i})\left(\int_{z_0}^{z}\bar{q}(z')dz'\right)^b}$$

or an equivalent expression, where z=axial position
z'=integration variable representing the axial position
z''=integration variable representing the axial position
$q_i$(z)=linear heat generation rate of rod i at the level z
$\bar{q}$(z)=average linear heat generation rate of all rods in the bundle at the level z
$z_0$=the axial position of bulk boiling boundary (zero steam quality limit) in said bundle
$q_j$(z)=linear heat generation rate of side neighbouring fuel rod j at the level z
$q_k$(z)=linear heat generation rate of diagonal neighbouring fuel rod k at the level z
$S_i$=the set of side neighbouring fuel rods for the fuel rod i
$D_i$=the set of diagonal neighbouring fuel rods for the fuel rod i
$N_{Si}$=the number of side neighbouring fuel rods for the fuel rod i
$N_{Di}$=the number of diagonal neighbouring fuel rods for the fuel rod i
a=a constant, 0<a<1
b=a constant, 0<b<1
c=a constant, 0<c<1, preferably 0<c<0.25
d=a constant, 0<d<c, preferably 0<d<0.125
$e_i$=the dryout sensitivity constant for the fuel rod i (also denoted "rod constant")

Figure 3:
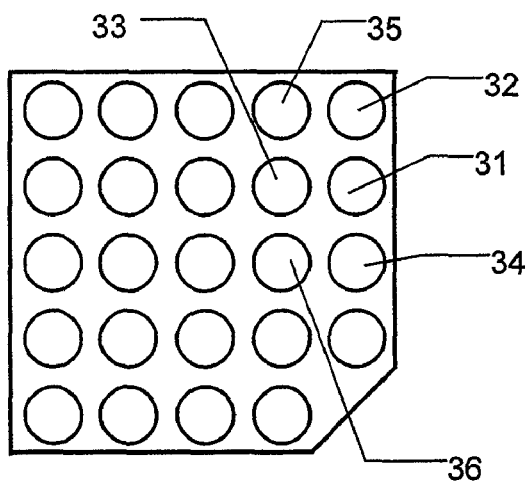
FIG. 3 is a schematic view of a cross section of a bundle of fuel rods.

The concepts used are known to a person skilled in the art. However, with reference to FIG. 3, it will now be explained what is meant by "side neighbouring fuel rods" and "diagonal neighbouring fuel rods". FIG. 3 show schematically a cross section of a bundle of 24 fuel rods. Four such bundles may together form a fuel assembly. As an example for explaining side and diagonal neighbouring fuel rods, we may consider the fuel rod marked 31. This fuel rod has three side neighbouring fuel rods, i.e. the fuel rods 32, 33 and 34, and two diagonal neighbouring fuel rods, i.e. the fuel rods 35 and 36.

The present invention thus provides methods and devices for determining the R-factor and dryout properties in advantageous manners. It is thereby possible to predict and control the operation of a nuclear fuel plant with higher accuracy, and thereby to operate the plant with a high efficiency, while making sure that the dryout margin is sufficient.

The invention is not limited to the described embodiments, but can be varied within the scope of the claims. It should also be noted that a mathematical expression can normally be written in different manners and still have the same meaning, or approximately the same meaning. Consequently, the claims should not be seen as being limited to the exact mathematical expression defined in some of the claims. The claims are thus intended to cover equivalent expressions of the formula and alternative formulations that constitute approximations of the formulas. Such transformations are regularly done for numerical evaluations and can be tailored for high accuracy over a predetermined application range.

The invention claimed is:

1. A method of determining the R-factor for a bundle of nuclear fuel rods in a nuclear boiling light water reactor, which reactor comprises a plurality of bundles of nuclear fuel rods, wherein the fuel rods in the bundle are arranged side by side, at least substantially parallel to each other, and extend essentially in an axial direction, wherein said R-factor is a factor that accounts for a weighted local power influence on a fuel rod, including contributions from neighbouring fuel rods, the method comprising determining a local R-factor ($R_i$(z)) for each fuel rod (i) in said bundle and for each of a plurality of levels (z) in said axial direction, wherein an individual axial heat generation profile for a certain fuel rod (i) is taken into account when determining the local R-factors ($R_i$(z)) for said fuel rod (i), and determining a total R-factor ($R_z$) for each of said levels (z) for the whole bundle of fuel rods, wherein said total R-factor ($R_z$) at a level (z) is determined as a maximum of said local R-factors ($R_i$(z)) at said level (z) in said bundle of nuclear fuel rods.

2. A method according to claim 1, wherein said number of levels is at least equal to 10.

3. A method according to claim 1, wherein said bundle of nuclear fuel rods includes at least 15 fuel rods.

4. A method according to claim 1, wherein the determination of said local R-factor ($R_i$(z)) at a level (z) for a certain fuel rod (i) includes the determination of a double integrated heat generation rate of said fuel rod (i) up to the level (z) relative to a double integrated average heat generation rate of all fuel rods in the bundle up to the level (z).

5. A method according to claim 4, wherein said determination also includes a normalisation by means of the integrated heat generation rate of said fuel rod up to the level (z) relative to the integrated average heat generation rate of all fuel rods in the bundle up to the level (z), wherein the normalised determination of the double integrated heat generation rate of said fuel rod (i) up to the level (z) relative to the double integrated average heat generation rate of all fuel rods in the bundle up to the level (z) is carried out by determining:

$$\left[\frac{\int_{z_0}^{z} q_i(z')dz' \int_{z_0}^{z}\int_{z_0}^{z'} \bar{q}(z'')dz''dz'}{\int_{z_0}^{z}\bar{q}(z')dz' \int_{z_0}^{z}\int_{z_0}^{z'} q_i(z'')dz''dz'}\right]^a$$

where
z=axial position
z'=integration variable representing the axial position z″=integration variable representing the axial position
$q_i(z)$=linear heat generation rate of rod i at the level z
$\bar{q}(z)$=average linear heat generation rate of all rods in the bundle at the level z
$z_0$=the axial position of bulk boiling boundary (zero steam quality limit) in said bundle
a=a constant, 0<a<1.

6. A method according to claim 1, wherein the determination of said local R-factor ($R_i(z)$) at a level (z) for a certain fuel rod (i) includes the determination of the sum of an integrated heat generation rate of said fuel rod up to the level (z) and a fraction of integrated heat generation rates of fuel rods neighbouring said fuel rod up to the level (z), relative to an integrated average heat generation rate of all fuel rods in the bundle up to the level (z).

7. A method according to claim 6, wherein said determination of the sum of the integrated heat generation rate of said fuel rod up to the level (z) and the fraction of the integrated heat generation rates of fuel rods neighbouring said fuel rod up to the level (z), relative to the integrated average heat generation rate of all fuel rods in the bundle up to the level (z) is carried out by determining:

$$\frac{\left(\int_{z_0}^{z} q_i(z')dz'\right)^b + c\sum_{j\in S_i}\left(\int_{z_0}^{z} q_j(z')dz'\right)^b + d\sum_{k\in D_i}\left(\int_{z_0}^{z} q_k(z')dz'\right)^b}{(1+cN_{S_i}+dN_{D_i})\left(\int_{z_0}^{z} \bar{q}(z')dz'\right)^b}$$

(30)

where the symbols are as explained in claim 6 and where
$q_j(z)$=linear heat generation rate of side neighbouring fuel rod j at the level z
$q_k(z)$=linear heat generation rate of diagonal neighbouring fuel rod k at the level z
$S_i$=the set of side neighbouring fuel rods for the fuel rod i
$D_i$=the set of diagonal neighbouring fuel rods for the fuel rod i
$N_{Si}$=the number of side neighbouring fuel rods for the fuel rod i
$N_{Di}$=the number of diagonal neighbouring fuel rods for the fuel rod i
b=a constant, 0<b<1
c=a constant, 0<c<1
d=a constant, 0≦d≦c.

8. A method according to claim 1, wherein the determination of said local R-factor at a level (z) for a certain fuel rod ($_i$) is carried out by determining:

$$R_i(z) = (1+e_i)\left[\frac{\int_{z_0}^{z} q_i(z')dz' \int_{z_0}^{z}\int_{z_0}^{z'} \bar{q}(z'')dz''dz'}{\int_{z_0}^{z} \bar{q}(z')dz' \int_{z_0}^{z}\int_{z_0}^{z'} q_i(z'')dz''dz'}\right]^a$$

$$\frac{\left(\int_{z_0}^{z} q_i(z')dz'\right)^b + c\sum_{j\in S_i}\left(\int_{z_0}^{z} q_j(z')dz'\right)^b + d\sum_{k\in D_i}\left(\int_{z_0}^{z} q_k(z')dz'\right)^b}{(1+cN_{S_i}+dN_{D_i})\left(\int_{z_0}^{z} \bar{q}(z')dz'\right)^b}$$

where the symbols are as explained in claims 6 and 8 and where
$e_i$=the dryout sensitivity constant for the fuel rod i (also denoted "rod constant").

9. A processor configured for automatically determining the R-factor for a bundle of nuclear fuel rods in a nuclear boiling light water reactor, which reactor comprises a plurality of bundles of nuclear fuel rods, wherein the fuel rods in the bundle are arranged side by side, at least substantially parallel to each other, and extend essentially in an axial direction, wherein said R-factor is a factor that accounts for a weighted local power influence on a fuel rod, including contributions from neighbouring fuel rods, wherein the processor is configured with an input receiving data concerning a linear heat generation rate ($q_i(z)$) of the different fuel rods (i) at the different levels (z) in said bundle, and the processor is configured to determine the R-factor in accordance with the method of claim 1.

10. A computer program product comprising a computer-readable medium on which is recorded a computer program that is directly loadable into an internal memory of a computer, which computer program is configured to cause the computer to carry out the method of claim 1.

11. A method of determining a critical power for a bundle of nuclear fuel rods in a nuclear boiling light water reactor, wherein said method includes determining an R-factor according to the method of claim 1.

12. A method of determining a critical power by means of a local steam quality at dryout ($X_{DO}$) for a bundle of nuclear fuel rods in a nuclear boiling light water reactor, which method comprises:
(1) determining how the local steam quality at dryout ($X_{DO}$) depends on flow of cooling medium through the nuclear fuel bundle ($f_1(G)$),
(2) determining how the local steam quality at dryout ($X_{DO}$) depends on axial power profile of the nuclear fuel bundle ($f_2(I_2)$),
(3) determining how the local steam quality at dryout ($X_{DO}$) depends on R-factor of the nuclear fuel bundle ($f_3(R)$),
(4) determining how the local steam quality at dryout ($X_{DO}$) depends on pressure of the cooling medium in the nuclear fuel bundle ($f_4(P)$), and
(5) determining the local steam quality at dryout ($X_{DO}$) based on determinations made in steps (1) through (4), characterised in that the R-factor dependence is determined by using the method of claim 1 for determining the R-factor.

13. A nuclear energy plant comprising a nuclear boiling light water reactor, which plant comprises a control unit arranged to carry out a method according to claim 11.

14. A nuclear energy plant according to claim 13, including operation parameter detectors, arranged to detect operation parameters of the nuclear reactor during operation, wherein the control unit is arranged to receive information concerning said operation parameters from the detectors and to use these operation parameters when carrying out the method.

15. A nuclear energy plant according to claim 13, wherein the control unit comprises control outputs arranged to control the operation of the nuclear reactor in dependence on said method carried out by the control unit.

16. A computer program product comprising a computer-readable medium on which is recorded a computer program that is directly loadable into an internal memory of a computer which forms part of a control unit, which computer program is configured to cause the computer to carry out a method according to claim 11.

17. A method of operating a nuclear energy plant comprising a nuclear boiling light water reactor, wherein said method includes the following steps:
(a) providing information concerning operation parameters of the nuclear reactor,
(b) using this information in a method according to claim 11, and
(c) controlling the operation of the nuclear reactor in dependence on step (b).

* * * * *